United States Patent [19]
Stewart et al.

[11] Patent Number: 5,898,438
[45] Date of Patent: Apr. 27, 1999

[54] TEXTURE MAPPING OF PHOTOGRAPHIC IMAGES TO CAD SURFACES

[75] Inventors: Paul Joseph Stewart; Yifan Chen, both of Ann Arbor, Mich.

[73] Assignee: Ford Global Technologies, Inc., Dearborn, Mich.

[21] Appl. No.: 08/746,595

[22] Filed: Nov. 12, 1996

[51] Int. Cl.$^6$ .................................................. G06T 11/40
[52] U.S. Cl. ............................................ 345/425; 345/430
[58] Field of Search ............................ 345/418–20, 430, 345/425

[56] References Cited

U.S. PATENT DOCUMENTS

| | | |
|---|---|---|
| 4,586,038 | 4/1986 | Sims et al. . |
| 5,255,352 | 10/1993 | Falk . |
| 5,319,744 | 6/1994 | Kelley et al. . |
| 5,742,291 | 4/1998 | Palm ........................................ 345/420 |

OTHER PUBLICATIONS

"Texture and Reflection in Computer Generated Images" Communications of the ACM, Oct. 1976, vol. 19, No. 10.
"Two–Part Texture Mappings" IEEE CG&A 1986.
"Survey of Texture Mapping" IEEE CG&A 1986.
"Texture Modeling Applications" The Visual Computer 1987.
"Texture Mapping as a Fundamental Drawing Primitive" Proc. Fourth Eurographics Workshop on Rendering, Paris, France, Jun. 1993.
"Computer Graphics" Second Edition, Principles and Practice, Addison–Wesley Publishing Co.

*Primary Examiner*—Mark K. Zimmerman
*Attorney, Agent, or Firm*—David B. Kelley

[57] ABSTRACT

A method for mapping a two-dimensional image of a physical object onto a computer generated three-dimensional surface defined by a plurality of surface points in a CAD space has the steps of creating a two-dimensional texture image plane of the physical object by taking a photograph of the physical object with a photographic device and converting the photograph into a texture image plane having a plurality of texture image plane points, determining a physical position of the photographic device with respect to the physical object, and transferring the texture image plane onto the three-dimensional surface. The transfer is accomplished by positioning a synthetic camera in the CAD space with respect to the three-dimensional surface according to the physical position of the photographic device, mapping each of the plurality of surface points viewable by the synthetic camera to a corresponding texture image point in the texture image plane, and assigning texture coordinates to each of the plurality of surface points from the corresponding texture image plane point.

4 Claims, 8 Drawing Sheets

TEXTURE MAPPING OF PHOTOGRAPHIC IMAGES TO CAD SURFACES

FIELD OF THE INVENTION

The present invention relates to texture mapping of CAD objects in general, and more specifically to texture mapping through use of photographic images.

BACKGROUND OF THE INVENTION

Texture mapping is the process of transferring a two-dimensional image onto a three-dimensional computer generated surface. For example, photographic pictures of gauges, dials and controls can be texture mapped onto a simple three-dimensional foundation surface to give a sophisticated rendering of an instrument panel without the need to geometrically model these details. Many automotive applications make use of this technique because it provides photo-realistic images at high frame rates in a cost-effective manner. Particular applications include, but are not limited to, concept vehicle design, product testing in a virtual environment and market evaluation studies.

Figure 1:
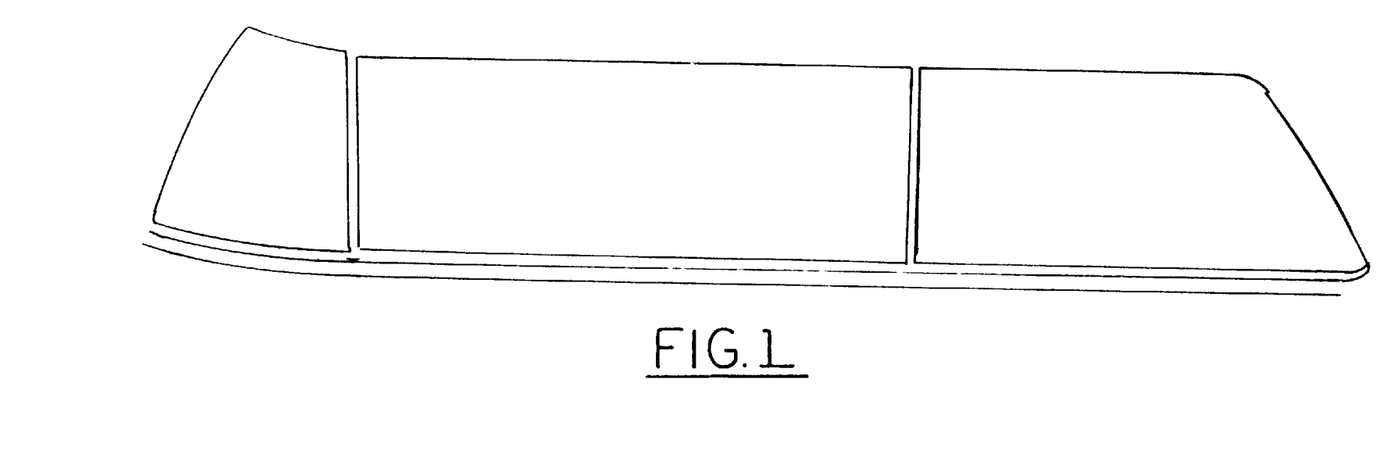
FIG. 1 is a photograph of an automotive vehicle rear tail light.

Many commercial CAD systems are capable of creating and rendering texture maps. However, existing texture map techniques are only effective on planar or near planar surfaces. The mapped images tend to warp and distort when applied to free-form surface geometries common in automotive CAD applications. An example of such distortion is seen by comparing FIG. 1, a photograph of a vehicle tail lamp, with FIG. 2, a texture mapped CAD surface of the same tail lamp. The anomalies apparent in FIG. 2 can be corrected by a commercial artist, but this approach is both expensive and non-deterministic.

Figure 2:
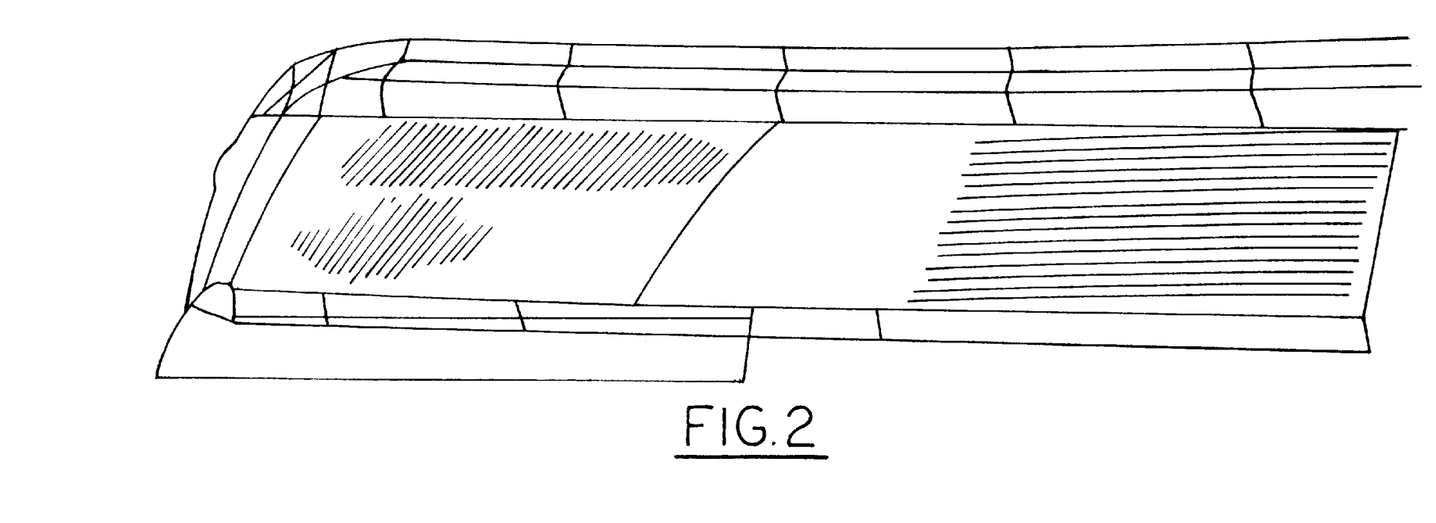
FIG. 2 is a CAD image of the tail light of FIG. 1 showing distortion due to mapping the photograph to the CAD image.

The warping and distortion seen in FIG. 2 can be traced to the transfer functions used by the texture mapping technique, which is similar to those used in most current texture mapping techniques. These techniques use a transfer function which relates the surface points of a three-dimensional object to locations in a two-dimensional image space. The function can be defined in either direction; that is, the object can be mapped to the image space or the image space can be mapped to the object. Typically, mapping from the image space to the object is done geometrically by projecting a two-dimensional algebraic surface, such as a plane or sphere representing the image space, onto the object. Any mismatch between the algebraic surface and the three-dimensional surface results in an image distortion (FIG. 2). Mapping from the object to image space must be procedural and can, therefore, be non-deterministic. Various procedures include node-relaxation and surface distance and direction methods, which still introduce image warping. Furthermore, to be computationally feasible these transfer functions are of low order, resulting in discontinuities in the mapped image.

Other existing methods can provide better results by splitting individual details into many small components, each relatively flat and with a separate texture map. However, this reduces flexibility and requires a significant amount of time and effort to produce a finished model. In U.S. Pat. No. 5,255,352, the problem of texture mapping two-dimensional texture images onto developable surfaces, that is, surfaces which can be made solely from flat panels, is addressed. This method is not applicable to free-form surfaces, however, and thus not of practical importance for the automotive industry or other industries desiring a more robust procedure. Another procedure utilizes a polygon fragmentation method of distortion correction for computer image generating systems, as disclosed in U.S. Pat. No. 5,319,744. This method tries to solve the distortion problem by pre-distorting the texture image. The method, however, does not take into account the distortion due to the perspective model used to capture the original texture image. Furthermore, the pre-distortion technique introduces several discontinuities into the mapped image.

Thus, a method is needed to efficiently texture map photographs of large sections of vehicle components onto the surface of a three-dimensional CAD object without distortion.

SUMMARY OF THE INVENTION

In response to deficiencies in the related art, the present invention provides a method for mapping a texture image from a physical object onto the surface of a CAD object, without distortion or discontinuity.

Existing processes treat a digital image of a photograph as a two-dimensional texture space. The color of a point from the CAD model is then found by mapping it into this texture space. The mapping process is treated as a single mathematical transform from the flat digital image to the surface of the CAD object.

This new method applies two mathematical transforms to the mapping process. The first transform is from the object to the image plane of a physical camera. This image plane is then equated to the image plane of a synthetic camera. The second transform is then from the synthetic image plane to the CAD object. The two transform method is significant because it produces a faithful, distortion-free texture-mapping when the second transform is calculated as the inverse of the first.

The method of the present invention, for mapping a two-dimensional image of a physical object onto a computer generated three-dimensional surface defined by a plurality of surface points in a CAD space, has the steps of creating a two-dimensional texture image plane of the physical object by taking a photograph of the physical object with a photographic device and converting the photograph into a texture image plane having a plurality of texture image plane points, determining a physical position of the photographic device with respect to the physical object, and transferring the texture image plane onto the three-dimensional surface. The transfer is accomplished by positioning a synthetic camera in the CAD space with respect to the three-dimensional surface according to the physical position of the photographic device, mapping each of the plurality of surface points viewable by the synthetic camera to a corresponding texture image point in the texture image plane, and assigning texture coordinates to each of the plurality of surface points from the corresponding texture image plane point.

An advantage of the present invention is a method which provides a faithful and distortion-free texture-mapping of photographic images onto CAD models.

Another advantage of the present invention is a camera projection method which cancels out distortions that occur at non-perpendicular angles of incidence so that photographs of the physical object can be taken from any angle as long as the area of interest is visible.

Yet another advantage is that fewer photographs are needed to render an entire area to be texture mapped.

Still another advantage of the present invention is a method which produces a unique texture mapped result for each CAD object as opposed to existing methods which produce non-unique results.

Yet still another advantage is a method which can be generalized to texture-map non-photographic images.

Another advantage is a method for photographing a physical model and automatically transferring the resulting image onto a CAD surface.

A feature of the present invention is a method which applies two mathematical transforms to the mapping process, including a first transform from the object to the image plane of a physical camera, the image plane equated to the image plane of a synthetic camera, and a second transform, calculated as the inverse of the first transform, to map the synthetic image plane to a CAD object.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 3:
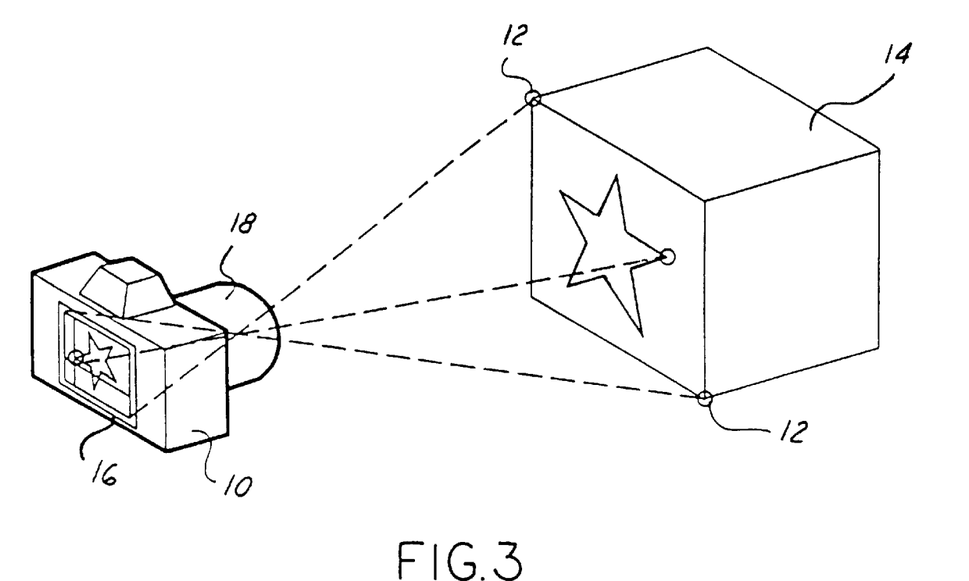
FIG. 3 is a perspective view showing image texture creation according to one embodiment of the present invention.
Figure 4:
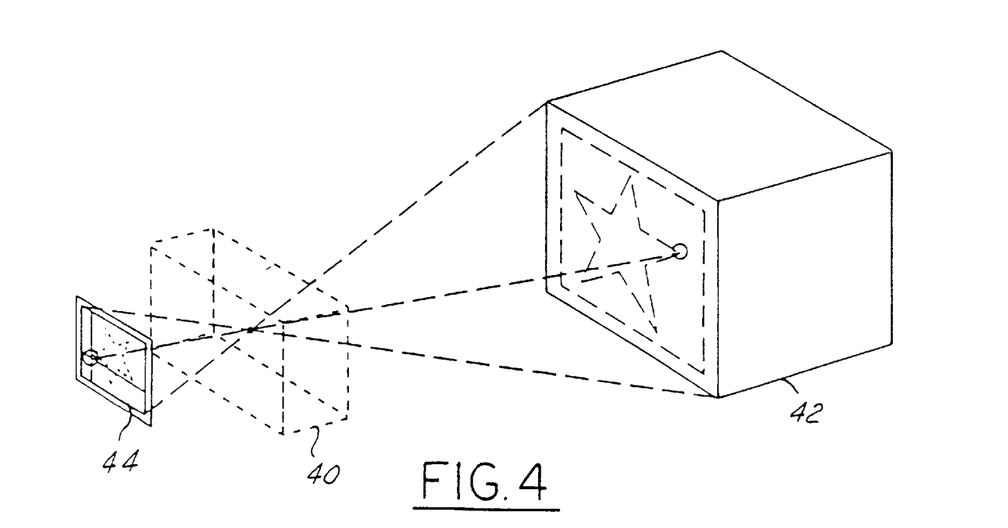
FIG. 4 is a perspective view showing texture mapping of the texture image created in FIG. 3 to an object.

Referring now to the drawings, and in particular to FIGS. 3 and 4 thereof, two portions of the texture mapping method of the present invention are shown graphically. The apparatus shown in FIG. 3 will be described with the texture creation portion of the method shown in the flow chart of FIG. 5, whereas the texture mapping portion of FIG. 4 corresponds to the flow chart of FIG. 6.

Referring now to FIG. 3, a camera 10 is positioned so that several feature points 12 on a physical object 14, such as a cube with a star thereon, are viewable by the camera 10. The feature points 12 are preferably selected as readily identifiable features of the physical object 14, such as corners of a cube and points of a star (FIG. 3). A photograph 16 is then taken of the physical object 14 with the photographic device 10. For purposed of this disclosure, a photographic device may encompass all devices for creating a two-dimensional image of an object or a scene. Such devices may include for example, a camera either a hand held camera or a television camera, a camcorder, and other similar devices. For purposes of this disclosure, a photograph means a two-dimensional image produced by a photographic device, regardless of the form that the image takes. The photograph, however, must be convertible into a digital image. Conversion of the photograph into a digital image produces an original texture image plane having a plurality of texture image plane points. A two-dimensional coordinate system, or texture coordinate system, is established for the original texture image plane. Each of the texture image plane points has a pair of texture coordinates associated therewith determined by a location measured on the two axes of the texture coordinate system, generally in pixel (integer) units.

Figure 5:
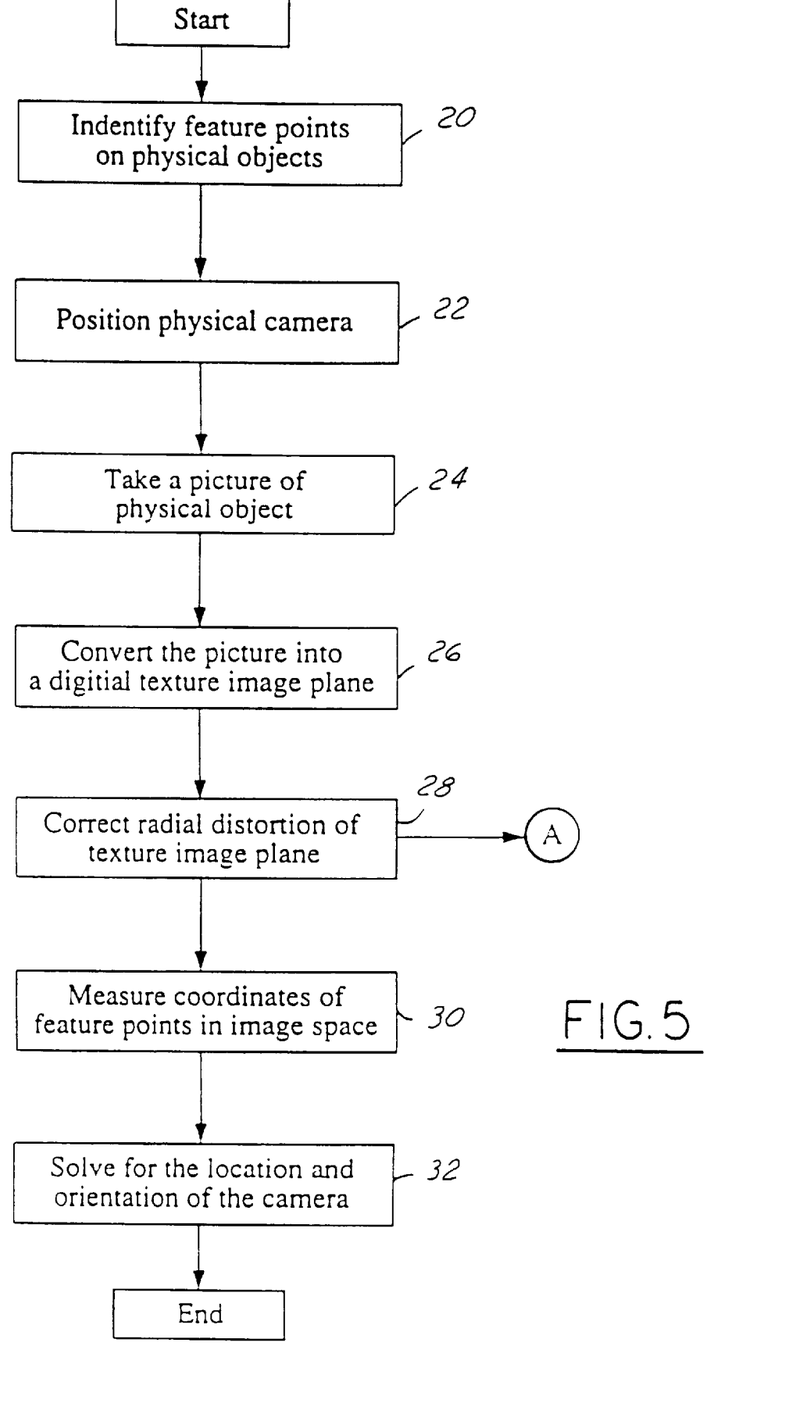
FIG. 5 is a flow chart showing the texture image creation portion of the method according to the present invention.

Turning now to FIG. 5, the texture creation portion of the texture mapping method of the present invention will be described. In box 20, the feature points on the physical object are identified. The physical camera is then positioned in box 22 so that the feature points 12 are viewable by the camera. The position of the camera is limited only by the line-of-sight rule which requires that the entire texture region is free from occlusion. That is, the camera must be positioned to obtain an image that contains the entire region of the physical object for which a texture mapping to a CAD surface is to be performed. It should be noted that the view direction of the camera need not be perpendicular to the physical object surface. When the camera has been properly positioned, a picture is taken of the physical object as represented in box 24. It should be understood that photograph is used simultaneously with picture for purposes of this disclosure. The picture is then converted into a digital texture image plane, refereed to as an original texture image plane. Such a conversion can be accomplished, for example, by scanning the photograph into a computer. Other ways of converting the picture into a digital texture image plane are also possible in the steps in boxes 24 and 26 of FIG. 5 can be accomplished together with a single photographic device such as a camcorder. Other methods will occur to those skilled in the art, such as a digital camera, in which case the step in box 26 is not necessary since the output from a digital camera is already in digital format.

Continuing with FIG. 5, the original texture image plane is corrected in box 28 for radial distortion due to a lens 18 (FIG. 3) of the camera. This correction of the radio distortion of the photographic device, which is described in further detail below, results in a corrected texture image plane. Next, a physical location and physical orientation of the photographic device with respect to the physical object is determined in boxes 30, 32. In box 30, the accordance of the feature points identified in box 20 are measured in the corrected texture image plane. The physical location and physical orientation of the photographic device can then be determined using a procedure more fully described below. Those skilled in the art will recognize that there are several procedures for determining the location and orientation of the camera based upon the coordinates of the feature points as captured in the corrected texture image plane.

Figure 6:
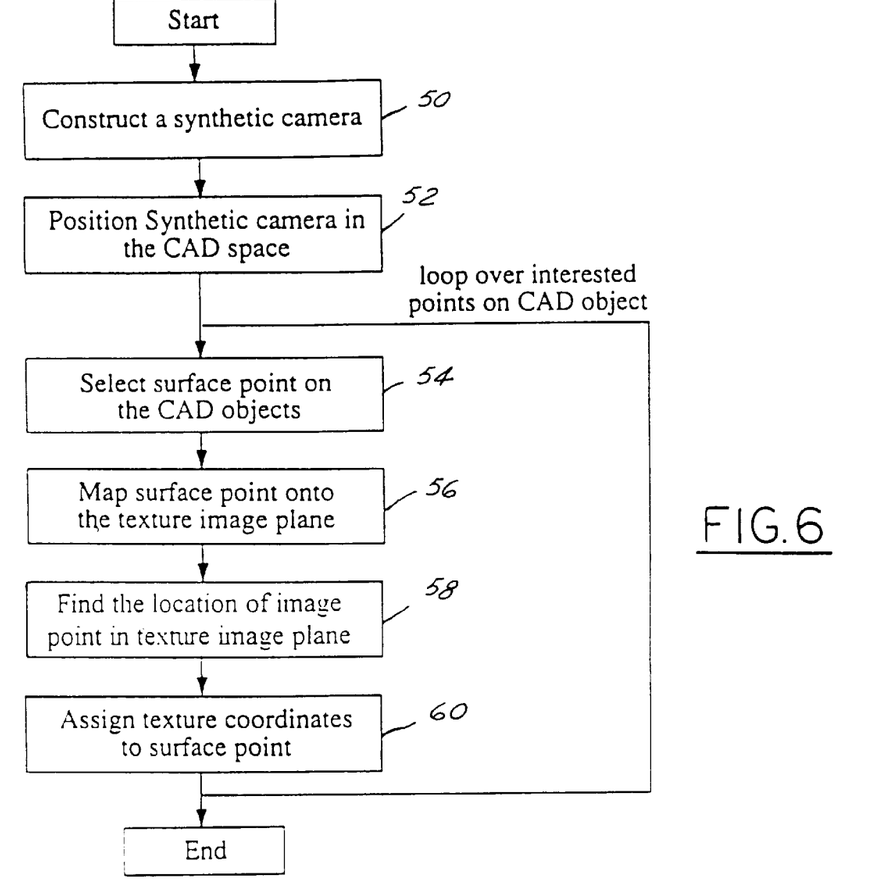
FIG. 6 is a flow chart showing the texture mapping portion of the method according to the present invention.

Turning now to FIGS. 4 and 6, the texture mapping portion of the present invention will be described. In FIG. 4, a synthetic camera is constructed, for example in accordance with known techniques. The synthetic camera 40 is then positioned in the CAD space with respect to the three-dimensional surface 42 according to the physical location and orientation of the photographic device determined in boxes 30, 32 of FIG. 5. Each point of the three-dimensional surface (CAD object) corresponding to one of the surface points viewable by the physical camera, including the feature points 12, is then mapped to a corresponding point in the corrected texture image plane 44. The texture coordinate for each the point of the corrected texture image plane is then assigned to the corresponding surface point of the three-dimensional surface (CAD object).

The texture mapping process is shown in FIG. 6. In box 50, the synthetic camera is constructed and in box 52 the synthetic camera is positioned in the CAD space according to the physical location and physical orientation of the camera. It should be understood that the synthetic camera model must closely match the lens and image plane configuration of the physical camera. Then, for each surface point viewable by the synthetic camera, the steps in boxes 54–60 are accomplished. Beginning in box 54, a surface point on the three-dimensional surface is selected. In box 56, the surface point is then mapped onto a corresponding point in the corrected texture image plane through the synthetic camera. In box 58, the location of the image point in the corrected texture plane is determined, and the texture coordinates for the image point are then assigned to the corresponding surface in box 60. The method continues until all surface points of the three-dimensional surface have been assigned texture coordinates.

After all the surface points of the three-dimensional surface have texture coordinates assigned thereto, a texture rendering system, of which there are several known in the art, can be used to display the textured CAD surface.

As described above, texture image creation involves the use of photographic devices, sometimes referred to as image acquisition equipment. Whether the equipment is a typical camera, a digital camera, or a camcorder, the image is always formed through an optical lens or a group of optical lenses. It is known that images formed through optical lenses often exhibit distortions. The severity of the distortion depends on the type of lenses used and, more importantly, the focal length, or equivalently the view angle, of the lens used. For instance, a wide-angle lens often creates more severe distortion than a telescopic lens.

A synthetic camera used in computer graphics, however, is often constructed based on a primitive pin-hole model of image formation. The use of this model typically does not include image distortion due to the theoretical nature of model, as opposed to distortion which is known to exist in the physical world as described above. Thus, to faithfully map an image obtained of a physical object, i.e., with a physical camera having a lens potentially causing distortion, onto a computer generated CAD surface, it is necessary to first correct the image distortion due to the lens. The following lens distortion compensation method according to the present invention was developed for this purpose.

Figure 7:
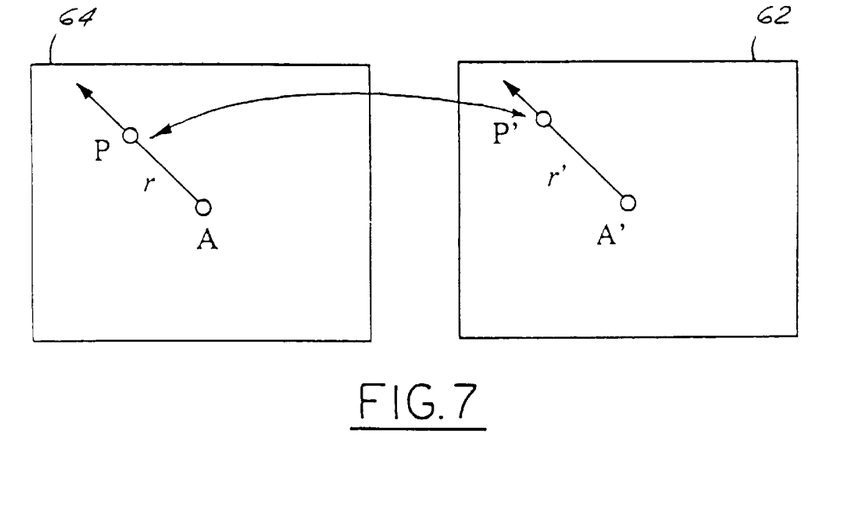
FIG. 7 is a diagram demonstrating radial distortion of an image due to a lens of a photographic device.

The lens distortion compensation method is based on the assumption that, due to the symmetry of an optical lens in its angular direction and asymmetry in radial direction, distortion occurs only in the radial direction of an original texture image plane. This assumption is called the radial-distortion assumption. For instance, given a point P' in the original texture image plane 62, its actual, correct location P should be somewhere along the radial direction of the point P', i.e., the direction from the center A' of the original texture image plane 62 to the point P', as illustrated in FIG. 7. Based on the radial-distortion assumption, a distorted image can be corrected using a one-dimensional correction function, $r'=f(r)$, where $r'$ denotes the radial distance of any point in the original texture image plane 62 and $r$ the radial distance in the corrected texture image plane 64.

Figure 8:
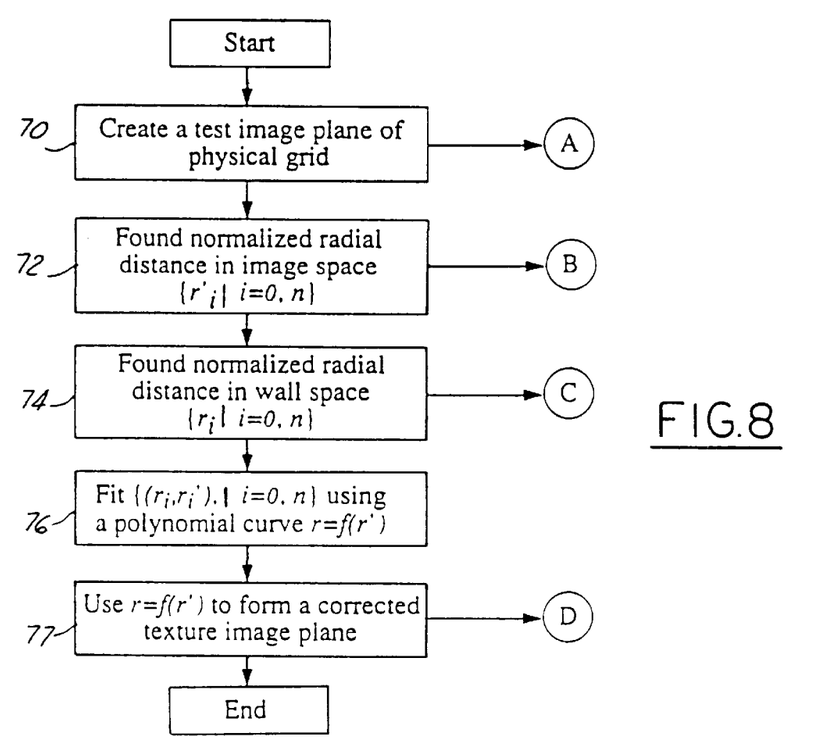
FIG. 8 is a flow chart showing a lens distortion compensation method according to the present invention.
Figure 10:
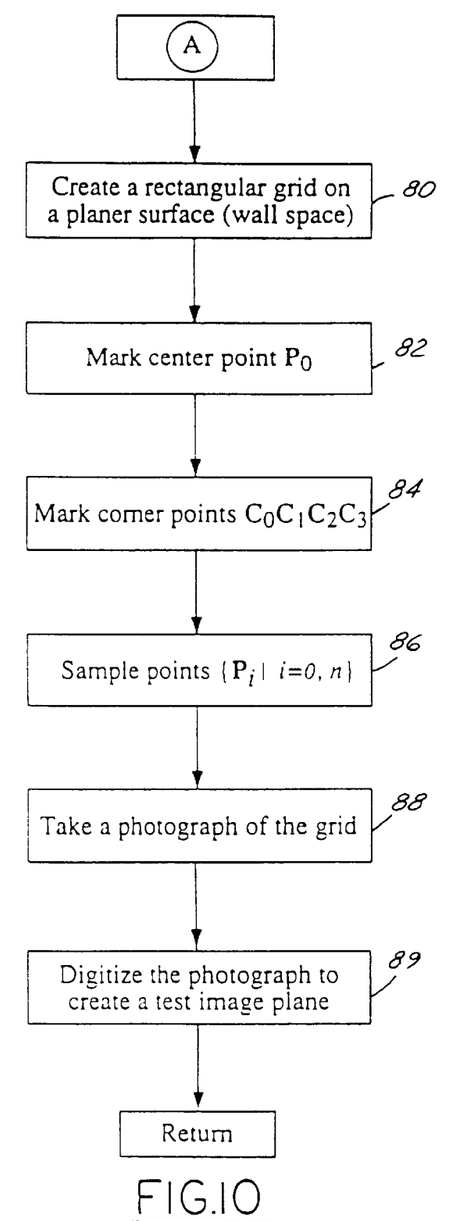
FIG. 10 is a flow chart showing a procedure for creating a test image for use in conjunction with the lens distortion compensation method of FIG. 8.

The lens distortion compensation method is shown in FIG. 8. In box 70, a test image plane is created using the photographic device to photograph a test grid, as is further described below with reference to FIG. 10. In boxes 72, 74, radial distances for all points in the test image plane and the test grid, respectively, are determined and normalized, as further described in FIGS. 11 and 13, respectively. After the set of radial distances $\{r_i, r'_i\}$ have been determined, a curve fitting method is used in box 76 to produce the one-dimensional, polynomial function correction function $r'=f(r)$. This function is then used in box 77 to form the corrected texture image plane, as FIG. 14 further describes.

Figure 9:
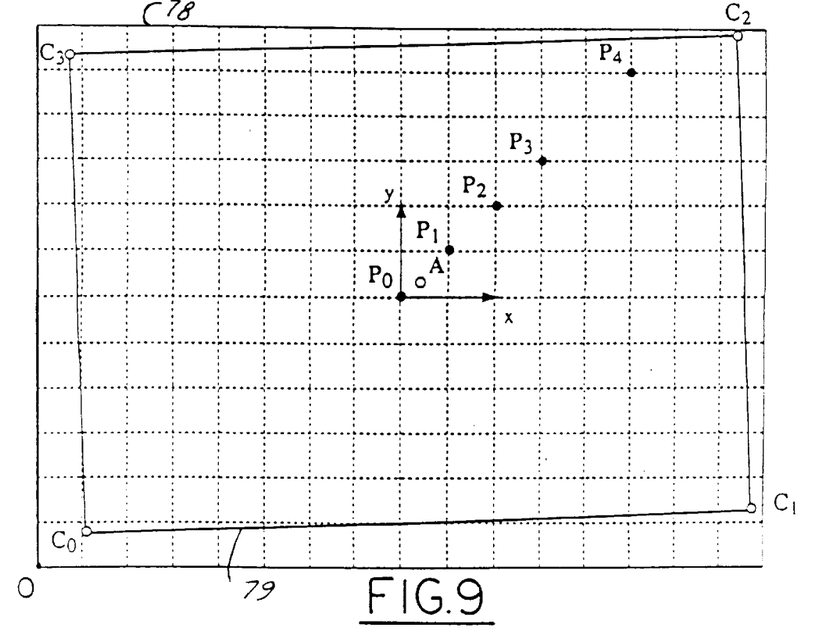
FIG. 9 is a grid showing sample data points for use with the lens distortion compensation method of FIG. 8.

To determine the set of data points $\{r_i, r'_i\}$ for use in the polynomial curve fitting method, a data acquisition method according to the present invention uses a physical rectangular grid 78 (FIG. 9) with known coordinates for its vertices. The grid 78 is posted on a physical wall and is then photographed with the same photographic device used above to create the original texture image plane. For this reason, the grid 78 on the physical wall is sometimes referred to as a wall space and the coordinates measured, the wall coordinates. Preferably, the following data acquisition method is performed before creation of the original texture image plane, and need only be done once for each photographic device. The data acquisition method has two sub-procedures: 1) create a test image plane from data points on the grid 78 (FIGS. 9–10); and 2) find the data set $\{r_i, r'_i\}$ (FIGS. 11–13). In the first sub-procedure (FIG. 10), the rectangular grid 78 is posted on a wall in box 80 and the camera is positioned so as to view the grid 78 within the camera's viewfinder. A center point $P_0$ is marked in box 82 on the rectangular grid 78 to be captured by the camera, and four corner points $C_0$–$C_3$ of the camera's viewfinder are marked as the corners of the rectangular region 79 in box 84. In box 86, additional data points $P_i$, i=1 to n are then marked on the rectangular gird 78. A photograph of the rectangular region 79 is taken with the camera in box 88, and the photograph is digitally converted, for example by scanning it into a computer, to create a test image plane in box 89.

Figure 11:
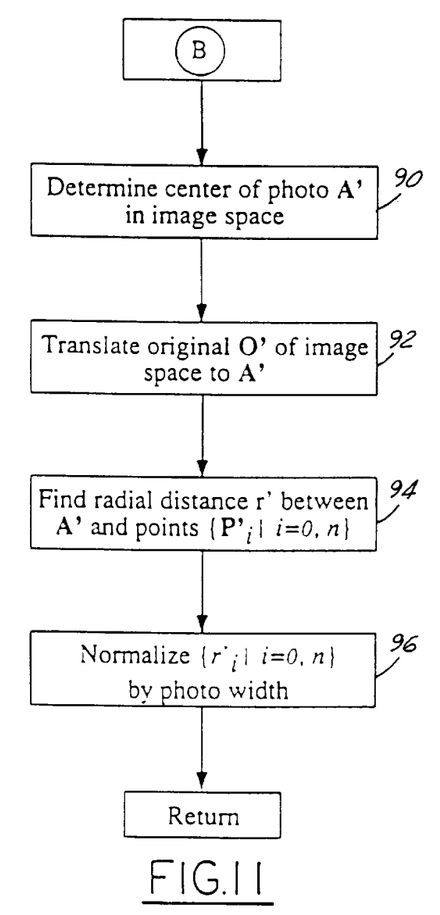
FIG. 11 is a flow chart showing an image space radial distance computation and normalization portion of the lens distortion method.
Figure 12:
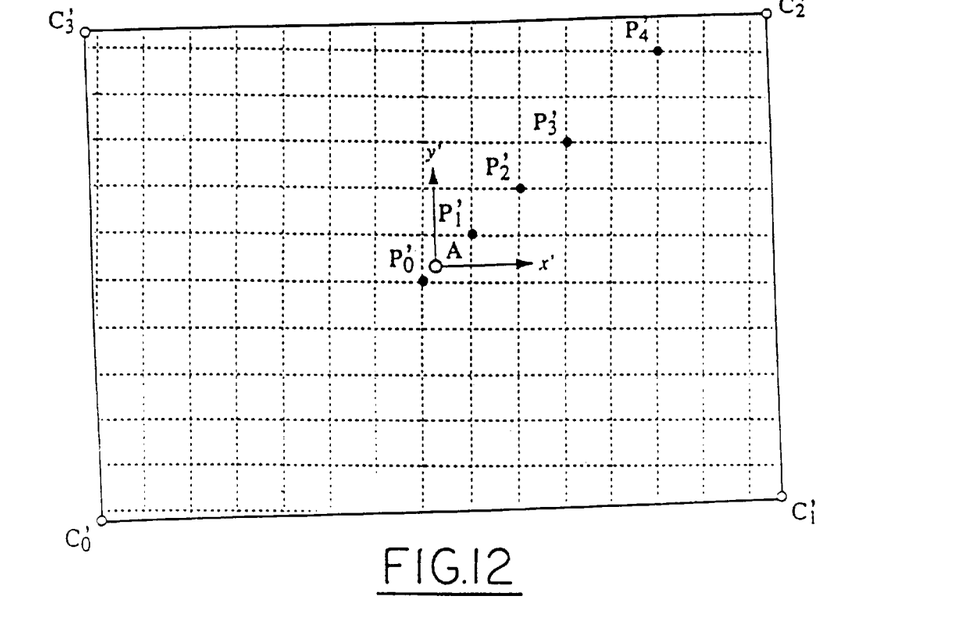
FIG. 12 is a grid demonstrating the normalization procedures used in conjunction with the lens distortion compensation method of the present invention.
Figure 13:
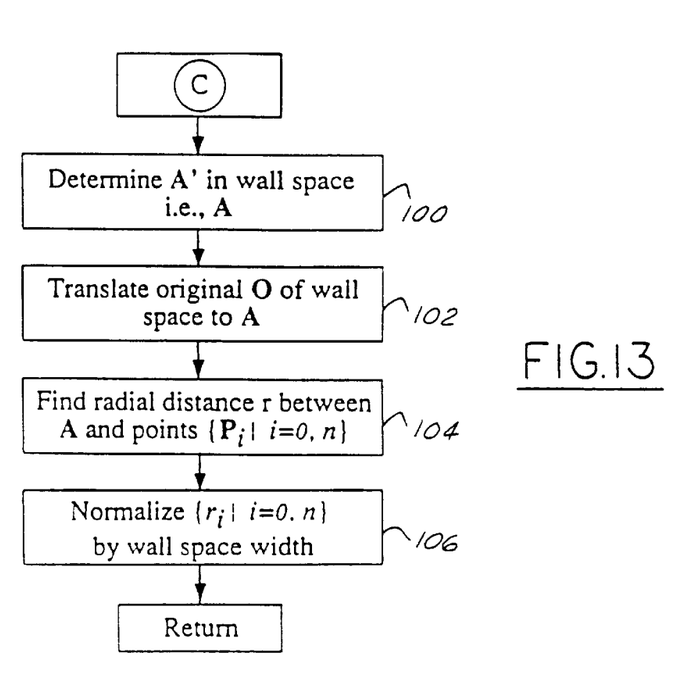
FIG. 13 is a flow chart showing an wall space radial distance normalization portion of the lens distortion method.

In the second sub-procedure of the data acquisition method, the set of radial distances $\{r_i, r'_i\}$ is determined from the test image plane and the rectangular region 78 captured in the camera's viewfinder, rectangular region 79 (FIGS. 11–13). Beginning with FIGS. 11 and 12, the geometric center of the test image plane is measured and marked as A' in box 90, and the original origin O' of the test image plane is translated to A' in box 92. Next, the radial distance in the test image plane for each original point $P'_i$, i=0 to n, is found in box 94 as follows:

$$r'_i = (\,(x'_i - x'_a)^2 + (y'_i - y'_a)^2\,)^{0.5}$$

In box 96, these radial distances are normalized $\{r'_i\}$ by the width of the photograph as follows:

$$r'_i = 4r'_i / (\|C'_2 - C'_0\| + \|C'_1 - C'_3\|)$$

where the $\|\ \|$ symbol represents absolute value

The test image plane radial distances of the data set $\{r_i, r'_i\}$ have thus been determined.

Next, with reference to FIG. 13, the location of A' in the wall space (i.e., A) is determined based on its location in the grid 78 in box 100, and the original origin O of the grid 78 is translated to A in box 102. The radial distance of the sample points on the grid 79 for $P_i$, i=0 to n, are then determined in box 104 as follows:

$$r_i = (\,(x_i - x_a)^2 + (y_i - y_a)^2\,)^{0.5}$$

where $(x_a, y_a)$ is the center location of the image in the wall coordinates. These radial distances are normalized $\{r_i\}$ by the rectangular region 79 width in box 106 as follows:

$$r_i = 4r_i / (\|C_2 - C_0\| + \|C_1 - C_3\|)$$

With the set of radial distances $\{r_i, r'_i\}$ having been determined, the correction function $r'=f(r)$ can be found using various methods known to those skilled in the art to fit a given set of data points. Preferably, a curve fitting method is used which fits a polynomial curve in the following form:

$$r' = a_1 r^1 + a_2 r^2 + \ldots + a_n r^n$$

where $\{a_j\}$ are the coefficients of the polynomials that can be determined using known techniques, for example a least-squares approximation.

Figure 14:
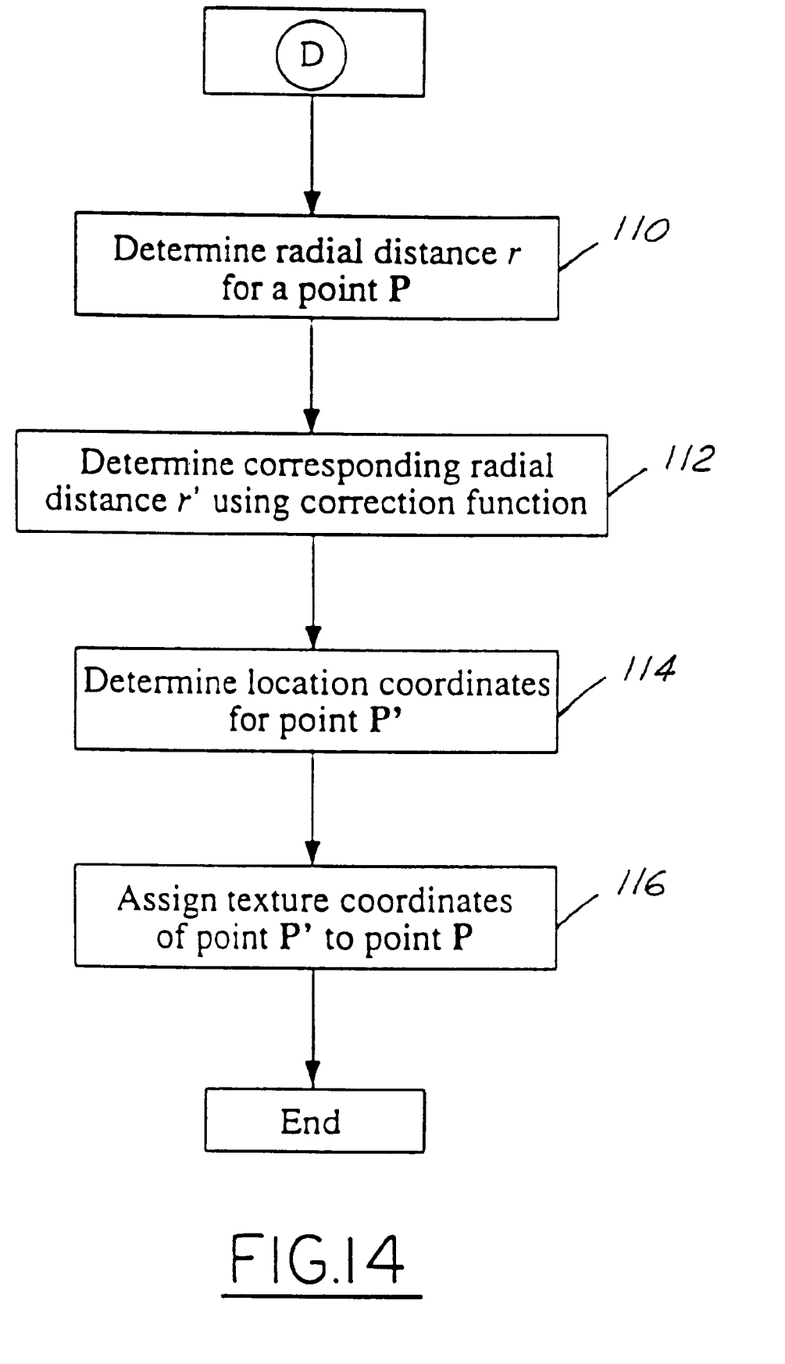
FIG. 14 is a flow chart showing creation of a corrected texture image plane using a correction function determined with the lens distortion method of the present invention.

With the correction function developed as described above, a corrected texture image plane can be created based on the original texture image plane, as seen by the process shown in FIG. 14. First, for a point P(x,y) in the corrected texture image plane, a radial distance r is determined as follows in box 110:

$$r = ((x-x_a)^2 - (y-y_a)^2)^{0.5}$$

where $A(x_a, y_a)$ is the geometric center of the corrected texture image plane, and where r is normalized as described above. The one-dimensional correction function, $r'=f(r)$, is then used in box 112 to find a corresponding radial distance, r', in the original texture image plane. The location coordinates of the original point in the original texture image plane are then determined as follows in box 114:

$$x' = x(r'/r) + x'_a$$

$$y' = y(r'/r) + y'_a$$

where $(x'_a, y'_a)$ is the center of the original texture image plane. Finally, the texture coordinates from the original point are assigned to the corrected point in box 116 for rendering point P in the corrected texture image plane. The process of FIG. 14 is done for each point in the corrected texture image plane.

Although the preferred embodiment of the present invention various changes and modifications may be made without departing from the scope of the invention as set forth in the appended claims.

We claim:

1. A computer system for texture mapping a two-dimensional image of a physical object onto a computer generated three-dimensional surface defined by a plurality of surface points in a CAD space, the computer system comprising:
    (a) means for creating a two-dimensional texture image plane of the physical object including means for:
        (i) identifying a plurality of feature points on the physical object;
        (ii) taking a photograph of the physical object with the photographic device so that the plurality of feature points are included therein; and
        (iii) converting the photograph into an original texture image plane having a plurality of texture image plane points;
    (b) means for correcting radial distortion of the original texture image plane due to a lens of the photographic device so as to produce a corrected texture image plane with a one-dimensional radial correction function, the radial one-dimensional function determined by:
        (a) marking a plurality of data points in a predefined two-dimensional physical wall space and determining a wall space radial distance for each of the plurality of data points;
        (b) taking a test photograph of the wall space with the photographic device;
        (c) converting the test photograph to a digital two-dimensional image space;
        (d) determining an image space radial distance for each of the plurality of data points in the image space; and
        (e) curve fitting the wall space radial distance and the corresponding image space radial distance pairs for each of the plurality of data points;
    (c) means for determining a physical location and physical orientation of the photographic device with respect to the physical object by:
        (i) measuring the coordinates of the feature points in the CAD space; and
        (ii) solving for the physical location and physical orientation of the photographic device based upon the coordinates of the feature points; and
    (d) means for transferring the corrected texture image plane onto the three-dimensional surface by:
        (i) constructing a synthetic camera;
        (ii) positioning and orienting the synthetic camera in the CAD space with respect to the three-dimensional surface according to the physical location and the physical orientation of the photographic device;
        (iii) mapping each of the plurality of surface points viewable by the synthetic camera to a corresponding corrected texture image plane point in the corrected texture image plane; and
        (iv) assigning texture coordinates to each of the plurality of surface points from the corresponding corrected texture image plane point.

2. A computer system according to claim 1 wherein the means for transferring the corrected texture image plane onto the three-dimensional surface is further comprised of means for:
    (i) determining a corrected radial distance of a corrected texture image plane point from a predetermined origin of the corrected texture image plane;
    (ii) using the one-dimensional radial correction function to find an original radial distance in the original texture image plane corresponding to the corrected radial distance;
    (iii) determining a pair of location coordinates for an original texture image plane point associated with the original radial distance in the original texture image plane;
    (iv) retrieving the texture coordinates for the original texture image plane point; and
    (v) assigning the texture coordinates to the corresponding corrected texture image plane point.

3. A computer system according to claim 1 including scanning means for scanning the photograph into a computer to convert the photograph into the original texture image plane having a plurality of texture image plane points.

4. a computer system according to claim 1 including electronic recording camera means for for discretizing the photograph so as to convert the photograph into the original texture image plane having a plurality of texture image plane points.

* * * * *